(12) United States Patent
Renaud et al.

(10) Patent No.: US 10,605,618 B2
(45) Date of Patent: Mar. 31, 2020

(54) ASSEMBLY FOR IMPLEMENTING AN AIRCRAFT TRAJECTORY AND RELATED PROCESS

(71) Applicant: DASSAULT AVIATION, Paris (FR)

(72) Inventors: Frank Renaud, Arles (FR); Christian Paquier, Bordeaux (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 15/915,731

(22) Filed: Mar. 8, 2018

(65) Prior Publication Data

US 2018/0259357 A1 Sep. 13, 2018

(30) Foreign Application Priority Data

Mar. 9, 2017 (FR) ...................................... 17 00250

(51) Int. Cl.
| | |
|---|---|
| *G01C 23/00* | (2006.01) |
| *B64D 43/00* | (2006.01) |
| *G05D 1/02* | (2020.01) |
| *G08G 5/00* | (2006.01) |
| *B63C 9/01* | (2006.01) |

(52) U.S. Cl.
CPC ........... *G01C 23/005* (2013.01); *B64D 43/00* (2013.01); *G05D 1/0202* (2013.01); *G08G 5/006* (2013.01); *G08G 5/0013* (2013.01); *G08G 5/0034* (2013.01); *B63C 9/01* (2013.01)

(58) Field of Classification Search
CPC ...... G01C 23/005; G05D 1/12; G05D 1/0202; B64D 43/00; B63C 9/01; G08G 5/0013; G08G 5/006; G08G 5/0034
See application file for complete search history.

(56) References Cited

U.S. PATENT DOCUMENTS

| | | | |
|---|---|---|---|
| 6,405,107 B1 | 6/2002 | Derman | |
| 7,965,202 B1 * | 6/2011 | Chiew | G01C 23/00 340/973 |
| 8,744,760 B1 * | 6/2014 | Mishmash | G01C 23/005 701/454 |
| 9,652,989 B1 * | 5/2017 | Myren | B64D 43/00 |

(Continued)

FOREIGN PATENT DOCUMENTS

FR 3023644 A1 1/2016

OTHER PUBLICATIONS

Corresponding French Search Report for FR1700250.

*Primary Examiner* — Brian Wilson
(74) *Attorney, Agent, or Firm* — Davidson, Davidson & Kappel, LLC

(57) ABSTRACT

An assembly for implementing an aircraft trajectory includes a flight management system including a viewer, and a display application, on the viewer, for navigation data of the aircraft including waypoints of the aircraft along a trajectory. The flight management system includes an application for recovering tactical track monitoring data, the display application being able to display, dynamically on the viewer, a tactical track positioning symbol corresponding to the or each tactical track being monitored, the position of the positioning symbol being updated by the display application as a function of position data of the aircraft and tactical track monitoring data corresponding to the tactical track, received from a data acquisition apparatus, via a data transmission system.

18 Claims, 4 Drawing Sheets

(56) References Cited

U.S. PATENT DOCUMENTS

| | | | |
|---|---|---|---|
| 2004/0239529 A1* | 12/2004 | Tran | G01C 23/00 340/961 |
| 2015/0066248 A1 | 3/2015 | Arbeit et al. | |
| 2015/0112549 A1* | 4/2015 | Mathew | G06K 9/0063 701/36 |
| 2016/0012733 A1 | 1/2016 | Girardeau et al. | |
| 2016/0180715 A1* | 6/2016 | Burke | G08G 5/0008 701/467 |

* cited by examiner

ASSEMBLY FOR IMPLEMENTING AN AIRCRAFT TRAJECTORY AND RELATED PROCESS

The present disclosure relates to an assembly for implementing an aircraft trajectory, including:

an avionics system comprising a flight management system, the flight management system including a viewer, and a display application, on the viewer, for navigation data of the aircraft including waypoints of the aircraft along a trajectory;

an apparatus for acquiring tactical track monitoring data corresponding to at least one tactical track being monitored by the aircraft, the data acquisition apparatus being outside the avionics system.

Such an assembly is in particular intended to assist the crew of an aircraft in carrying out search and rescue missions, using an aircraft.

These missions for example include maritime surveillance, for monitoring ships traveling in a zone, releasing a parcel, in particular a rescue and recovery chain, or the search for an individual who has fallen in the sea.

During these missions, it is often necessary to identify targets moving in the zone, and to bring the aircraft near these targets to perform the mission. These targets are for example a ship moving in the zone, a lifeboat placed in the sea, and/or a man overboard.

BACKGROUND

To identify these targets, it is known to use radar sensors, optoelectronic and/or infrared sensors. It is also known to use observations made by a mission operator inside or outside the aircraft.

The data relative to a target, as obtained from sensors or direct observations, constitute a tactical track monitored by the aircraft during its mission.

The data for monitoring a tactical track from sensors or observations are generally collected in a specific apparatus housed in the aircraft outside the cockpit. The specific apparatus is managed by a mission operator, separate from the crew piloting the aircraft.

The specific apparatus is independent of the avionics system of the aircraft. To carry out the mission, effective coordination must therefore be provided between the mission operator(s) responsible for monitoring the tactical tracks and the crew of the aircraft piloting the aircraft toward the tactical tracks.

In particular, the flight management systems of the aircraft are suitable for allowing pilots to define fixed waypoints of a trajectory of the aircraft and to guide the aircraft along this trajectory using an automatic piloting system.

In general, the operator in charge of the mission informs the pilot of the approximate position of the tactical track at a given time, or estimates what the position of the tactical track will be when the aircraft is over the zone.

The pilot then programs a fictitious waypoint corresponding to this approximate position and pilots the aircraft to this position.

The monitored target generally being a moving target, the operator in charge of the mission must refine the position of the tactical track and send it regularly to the pilot. The latter must then update the flight management system to correct the waypoint corresponding to the tactical track.

SUMMARY OF THE INVENTION

Such an operation is therefore tedious, requires frequent communication between the crew and the mission operators, and is a source of error. The crew's workload is therefore increased.

One aim of the invention is to obtain an assembly for implementing an aircraft trajectory that makes it possible to implement a wide variety of search and rescue missions, while decreasing the workload of the crew and the risk of error.

An assembly for implementing an aircraft trajectory is provided that includes:

a system for sending tactical track monitoring data connecting the data acquisition apparatus to the avionics system, the flight management system including an application for recovering tactical track monitoring data, the display application being able to display, dynamically on the viewer, a tactical track positioning symbol corresponding to the or each tactical track being monitored, the position of the positioning symbol being updated by the display application as a function of position data of the aircraft and tactical track monitoring data corresponding to the tactical track, received from the data acquisition apparatus, via the data transmission system.

The assembly according to the invention may comprise one or more of the following features, considered alone or according to any technically possible combination:

the display application is able to display a location symbol of a waypoint of the aircraft following the trajectory, as a function of position data of the aircraft, the waypoint location symbol being different from the tactical track position symbol;

the tactical track monitoring data including an identifier of the tactical track being monitored, the display application being able to display the identifier of the tactical track being monitored with the position symbol of the followed tactical track;

the flight management system includes an application for selecting a tactical track, able to allow a user to activate the monitoring of a tactical track from its position symbol;

the flight management system includes an application for defining at least one flight plan passing through at least one waypoint of the aircraft along a trajectory, and an application for guiding the aircraft along the flight plan, the activation of the monitoring of a tactical track being able to allow the insertion of the tactical track into the flight plan, the definition application being able to update the flight plan as a function of tactical track monitoring data corresponding to the tactical track, received from the data acquisition apparatus, via the data transmission system;

the activation of the monitoring of a tactical track comprises defining at least one constraint chosen from among the altitude of the aircraft at the tactical track, the speed of the aircraft at the tactical track, the arrival angle of the aircraft at the tactical track, the arrival time of the aircraft at the tactical track, the definition application being able to update the flight plan as a function of the defined constraints;

the activation of the monitoring of a tactical track comprises loading a search and rescue trajectory, or an orbital trajectory defined from the tactical track, the flight management system including an application for guiding the aircraft along the search and rescue trajectory or along the orbital trajectory;

the flight management system comprises an application for verifying the integrity of the tactical track data, and a deactivation application capable of deactivating the display of the position symbol of a given tactical track by the display application when the application verifying the integrity of the tactical track data indicates that the tactical track data are not reliable;

the flight management system comprises a deactivation application capable of deactivating the display of the position symbol of a tactical track monitored by the display application in the absence of transmission of tactical track data corresponding to the tactical track being monitored for a length of time exceeding a predefined time delay;

the data transmission system comprises a dedicated datalink between the data acquisition apparatus and the avionics system;

the dedicated datalink is a wired link, in particular a link according to standard ARINC 429;

the tactical track monitoring data are radar data, data from optoelectronic sensors and/or infrared sensors, and/or observation data entered by an operator.

A method for implementing an aircraft trajectory is also provided including the following steps:

providing an assembly as defined above;

acquiring, via the apparatus for acquiring tactical track monitoring data outside the avionics system, tactical track monitoring data corresponding to at least one tactical track monitored by the aircraft;

sending tactical track monitoring data via the data transmission system connecting the data acquisition apparatus to the avionics system, recovering tactical track monitoring data via the flight management system, dynamically displaying, via the display application of the flight management system, a position symbol of the tactical track on the viewer, updating the position of the tactical track position system via the display application as a function of position data of the aircraft and tactical track monitoring data corresponding to the tactical track, received from the data acquisition apparatus, by means of the data transmission system.

The method according to the invention may comprise one or more of the following features, considered alone or according to any technically possible combination:

selecting, on the viewer by a user, a tactical track position symbol, to activate the monitoring of a tactical track from its position symbol;

activating the monitoring of a tactical track comprises the insertion of the tactical track into a flight plan, and/or loading a search and rescue trajectory, or an orbital trajectory defined from the tactical track.

BRIEF SUMMARY OF THE DRAWINGS

The invention will be better understood upon reading the following description, provided solely as an example and done in reference to the appended drawings, in which.

DETAILED DESCRIPTION

Figure 1:
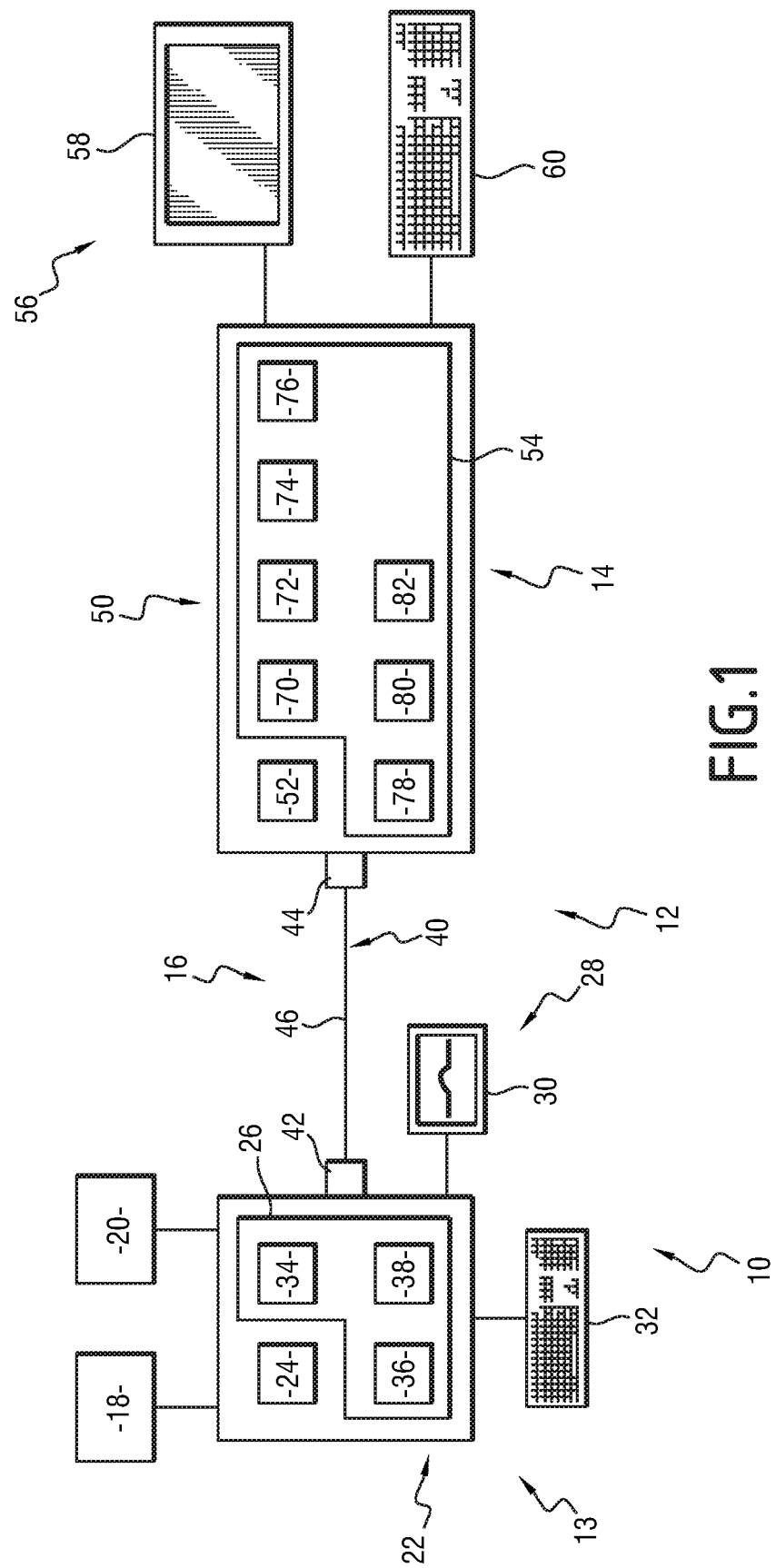
FIG. 1 is a schematic view of the relevant parts of an aircraft including an assembly for implementing a trajectory according to an embodiment of the invention.

An aircraft 10 including an assembly 12 for implementing a trajectory according to an embodiment of the invention is illustrated by FIG. 1.

The implementing assembly 12 is in particular intended to track a target moving on the surface of an expanse of water, during a search and rescue mission.

The implementing assembly 12 includes a mission system 13 allowing a mission operator to identify and track the target in the form of a tactical track, and an avionics system 14, assisting the crew of the aircraft 10 in piloting the aircraft 10.

The implementing assembly 12 further includes a data transmission system 16 connecting the mission system 13 to the avionics system 14.

The mission system 13 includes at least one sensor 18, 20 for detecting the target, and an apparatus 22, outside the avionics system 14, intended to acquire data for monitoring at least one tactical track corresponding to a target being tracked.

The data acquisition apparatus 22 will be referred to hereinafter as "outside apparatus".

In the example shown in FIG. 1, the mission system 13 includes a radar sensor 18 and/or an optoelectronic/infrared sensor 20.

Each sensor 18, 20 is able to generate tactical track monitoring data, in the form of an electromagnetic signature corresponding to the detection of the target. This signature is for example a radar, optoelectronic and/or infrared signature of the target.

The outside apparatus 22 advantageously operates independently of the avionics system 14. Thus, the outside apparatus 22 is not necessary for the operation of the aircraft 10 during a flight.

The outside apparatus 22 is preferably housed in the aircraft 10, outside the cockpit, in particular in a cabin located behind the cockpit.

The outside apparatus 22 is for example a desktop or laptop computer or a tablet. It includes a processor 24, a memory 26 containing software applications able to be run by the processor 24, and a man-machine interface 28.

The man-machine interface 28 includes at least one screen 30, and an element 32 for selecting and entering data on the screen 30, such as a virtual or real keyboard, and/or a touch-sensitive area of the screen 30.

The memory 26 contains an application 34 for identifying and collecting tactical track data, an application 36 for entering a tactical track identifier, and an application 38 for sending data to the avionics system 14.

The application 34 for identifying and collecting tactical track data is able to identify at least one tactical track from signals received from each sensor 18, 20 and to collect the tactical track monitoring data corresponding to the or each identified tactical track. These monitoring data in particular include the geographical position of the tactical track as a function of time (for example, latitude and longitude), as obtained from signals collected from the sensors 18, 20, and optionally the type of tactical track being monitored.

The identification and collection application 34 is also able to collect tactical track monitoring data entered manually by an operator using an entry element 32, based on observations made by the operator during the mission. These observations are for example direct visual observations of the target, or observations made from a display on the screen 30 generated from signals from the sensors 18, 20.

The application for entering an identifier 36 is able to allow the mission operator to associate an alphanumeric identifier with each tactical track being monitored, using the man-machine interface 28.

The application for sending data 38 is able to generate a set of data toward the transmission system 16 at a minimum frequency of 10 Hz. The data set includes, for each tactical track being monitored, at least one geographical position of the tactical track at a given time, and the identifier of the tactical track, which may be representative of the type of tactical track (for example ship, man overboard, etc.).

The data transmission system 16 includes at least one wired link 40 connecting the outside apparatus 22 to the avionics system 14. The wired link 40 is for example made according to standard ARINC 429. It includes at least one transmitter 42 connected to the outside apparatus 22 to communicate with the data sending application 38, at least one receiver 44, connected to the avionics system 14, and a shielded twisted pair 46 connecting the transmitter 42 to the receiver 44.

The avionics system 14 includes at least one flight management system 50, intended to interact with the crew of the aircraft to guide the crew for the navigation of the aircraft 10.

The flight management system is onboard. "Onboard" refers to a system mounted permanently in the aircraft when the latter is operating normally. The onboard system is necessary for the operation of the aircraft and is connected permanently to the other systems of the aircraft, preferably by physical links. It generally meets the certification requirements.

The flight management system 50 is different and separate from the outside apparatus 22. It includes a processor 52, a memory 54 containing software applications able to be carried out by the processor 52, and a man-machine interface 56.

The man-machine interface 56 is for example located in the cockpit of the aircraft 10. It includes a viewer 58 that is in particular a screen for navigating a dashboard. The navigation screen is preferably located in front of and above a median console placed between the seats of the pilots of the aircraft 10.

The man-machine interface 56 further includes at least one element 60 for entering data on the viewer 58, comprising a keyboard and/or a mouse and/or touch-sensitive areas of the viewer 58.

The flight management system 50 includes an application 70 for displaying navigation data on the viewer 58, an application 72 for defining flight plans that follow waypoints of the aircraft 10, and an application 74 for guiding the aircraft 10 to cause the aircraft 10 to follow a trajectory passing through waypoints according to a defined flight plan.

The flight management system 50 further includes an application 76 for recovering tactical track data coming from the outside apparatus 22 through the transmission system 16 and an application 78 for selecting and activating at least one tactical track on the viewer 58.

The flight management system 50 further includes an application 80 for verifying the integrity of the tactical track data, and an application 82 for deactivating the monitoring of a tactical track.

Figure 2:
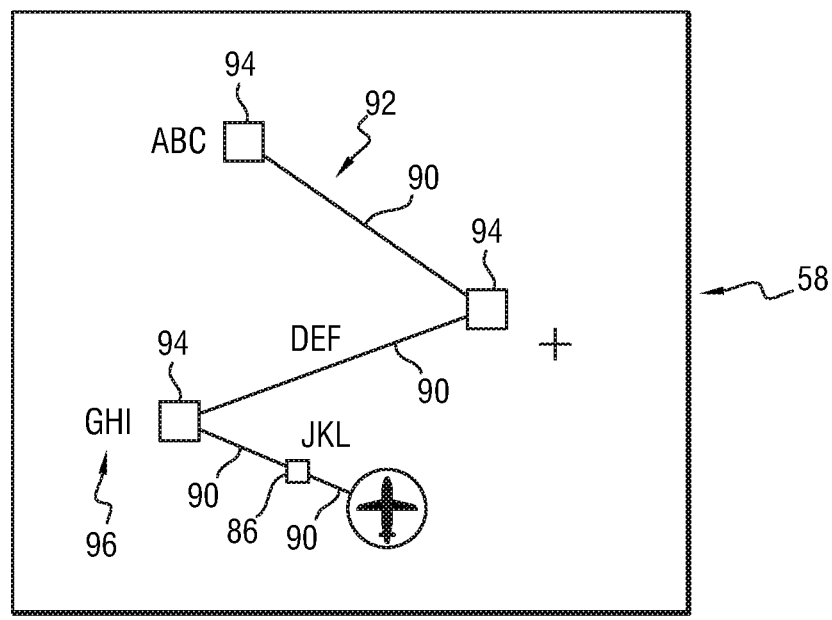
FIG. 2 is a view of a viewer of a flight management system illustrating the monitoring of tactical tracks.

The display application 70 is able to generate the display of navigation data on the viewer 58. In reference to FIG. 2, these navigation data in particular include a symbol 84 for the current position of the aircraft 10, and symbols 86 for the location of predefined waypoints having a fixed geographical position. The position of the waypoint location symbols 86 on the viewer 58 changes as a function of the position of the aircraft 10.

The navigation data further include segments 90 connecting the current position symbol 84 of the aircraft 10 to the successive waypoint location symbols 86 according to a flight plan 92. The flight plan 92 is thus defined by a series of segments between waypoints.

The flight plan definition application 72 is able to allow the selection of a waypoint location symbol 86 to insert the waypoint into a flight plan. It is able to allow the definition of navigation constraints at the waypoint, such as the altitude at the waypoint, the speed at the waypoint, the arrival angle at the waypoint, and the arrival time at the waypoint.

In a normal guiding mode, the guiding application 74 is able to provide data to an automatic pilot system (not shown) of the aircraft 10 to cause the aircraft 10 to follow the trajectory defined by the flight plan 92. The guiding application 74 is further able to enter a mission mode, to make the aircraft 10 follow a specific trajectory, in particular a search and mission trajectory, or an orbital trajectory, which will be defined later.

The data recovery application 76 is able to recover the tactical track data set generated by the outside apparatus 22, via the data transmission system 16. It receives the data from the receiver 44.

The data recovery application 76 is able to send the data associated with each tactical track to the display application 70 in order to allow the display, on the viewer 58, of a tactical track position symbol 94, potentially associated with the identifier 96 of the tactical track.

The position of the positioning symbol 94 of the tactical track on the viewer 58 is obtained from the current geographical position of the aircraft 10, like for the other waypoints, but also dynamically, based on recovered tactical track geographical position data.

The position of each tactical track positioning symbol 94 therefore changes over time, as a function of tactical track data sent from the outside apparatus 22 through the data transmission system 16.

Figures 3, 4:
FIGS. 3 and 4 are views of symbols intended to represent tactical tracks on the viewer of FIG. 2.

In the example shown in FIG. 3, the tactical track positioning symbol 94 is a square larger than the square symbolizing the positioning of the other waypoints, such as the waypoint 86. This illustrates a radar plot. The technical lead identifier 96 is displayed near the tactical track positioning symbol 94, for example horizontally at the same level as this symbol 94, to the left or right thereof.

In the alternative illustrated by FIG. 4, the tactical track symbol 98 is a symbol identifying an orbit to be performed.

The selection and activation application 78 is able to be implemented by a user of the flight management system 50, using the entry element 60 of the man-machine interface 56.

In particular, the selection and activation application 78 is able to be activated by selecting a tactical track positioning symbol 94 displayed on the viewer 58. The selection is for example done by moving a target toward the tactical track positioning system 94, then by implementing a particular routine, such as a right-click or double-click.

The selection and activation application 78 is in particular able to allow a tactical track to be transformed into a moving waypoint of the trajectory of the aircraft 10. To that end, the selection and activation application 78 is able to show an activation window 100 shown schematically in FIG. 5.

The activation window 100 comprises a button 102 for turning the tactical track into a waypoint, and a button 104 for defining constraints on the waypoint. It further advantageously includes a button 106 for including the tactical track in a flight plan 92, and optionally, a button 108 for selecting the type of mission to be performed at the tactical track.

Upon selection of the transformation button 102, the tactical track is able to be used as a waypoint to define a flight plan 92 using the definition application 72.

Figures 5, 6:
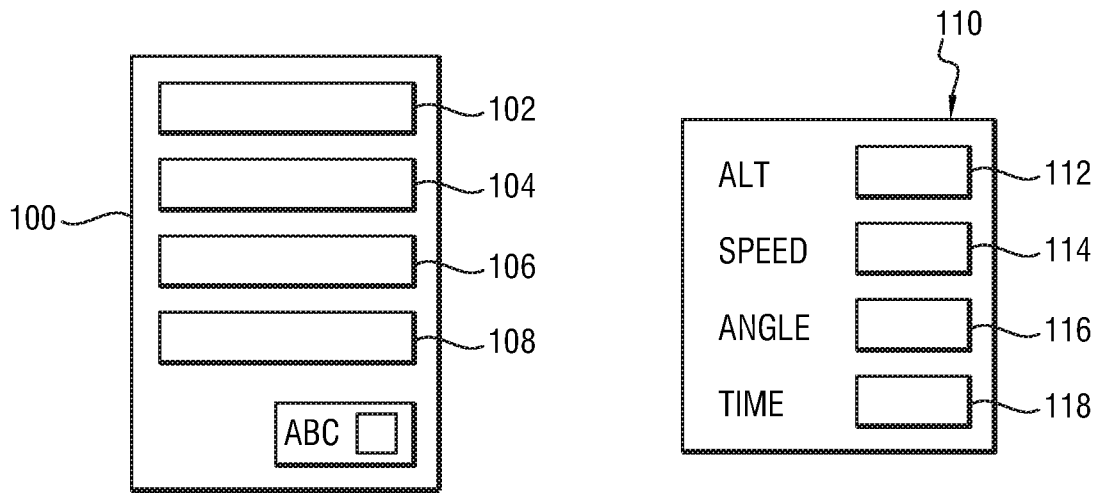
FIG. 5 is a view of a window for selecting and activating a tactical track.
FIG. 6 is a view of a window for selecting passage constraints of the aircraft at the tactical track.

Selecting the constraint definition button 104 can show a constraint selection window 110, visible in FIG. 6. The window 110 includes a field 112 for selecting a constraint altitude at the tactical track, a field 114 for selecting a constraint speed at the tactical track, a field 116 for selecting an angle of approach toward the tactical track and a field 118 for selecting an arrival time on the tactical track.

Upon selection of the button 106, the user is able to choose a flight plan 92 in which to include the tactical track and/or to define a direct navigation command ("direct to") toward the tactical track.

Upon selecting the button 108, the user is able to choose the type of mission to be performed when the aircraft 10 reaches the tactical track and to define the parameters of the mission. The mission is for example a search and rescue mission, which follows a search and rescue trajectory 212, examples of which are given in FIGS. 7 to 10.

These trajectories are for example defined in the International Aeronautical and Maritime Search and Rescue (IAMSAR) Manual published by the ICAO.

Figure 7:
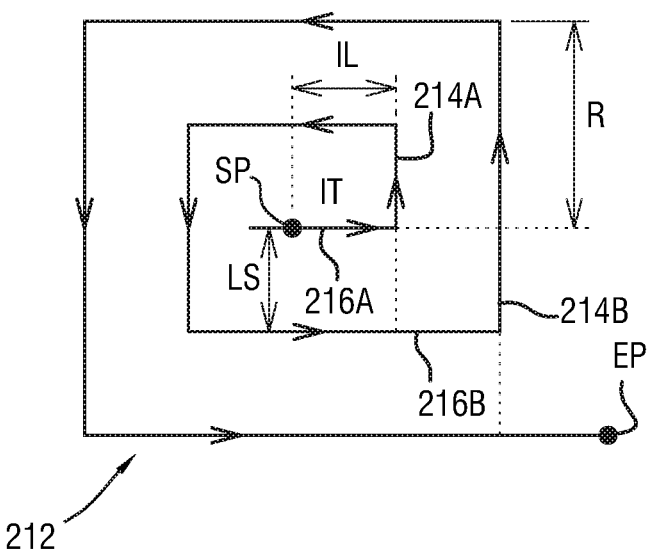
FIGS. 7 to 10 illustrate several normalized search and rescue trajectories, able to be carried out at a tactical track, using the avionics system according to an embodiment of the invention.

The search and rescue trajectory 212 illustrated by FIG. 7 is a so-called "expanding squares" trajectory.

It in particular applies to the search for a lifeboat from a last known position.

It is made up of successive segments that follow the contour of squares 214A, 214B that are substantially homothetic with respect to one another relative to the starting point SP of the trajectory.

The trajectory 212 does not follow the complete contour of each square 214A, 214B, but has a respective connecting segment 216A, 216B between the starting point SP and a first square 214A, then between each square 214A and the square 214B of the expanse just above that of the square 214A.

The expanse of the square 214B is, however, dependent on the visibility over the zone allowing an intersection between two successive branches corresponding to two successive squares 214A, 214B. Respect for this spacing guarantees 100% coverage of the search zone.

Such a trajectory 212 is therefore defined by a starting point SP, an initial travel direction IT, an initial length IL of a first connecting segment 216A defining the half-side of the first square 214A, a line spacing LS defining the spacing between the first connecting segment 216A and the second connecting segment 216B connecting the first square to the second square, a trajectory radius R that will be defined below, and a turning direction (in the clockwise or counterclockwise direction).

The trajectory 212 starts from the starting point SP and follows the initial travel direction IT over an initial length TL. It then has a 90° turn to follow the contour of the first square 214A over a first side of the square 214A, over a second side of the square 214A after a 90° turn, then over a third side of the square 214A after another 90° turn and lastly, over a fourth side of the square 214A after a 90° turn.

On the fourth side, the trajectory moves away from the first connecting segment 216A, perpendicular thereto, by a distance equal to the line spacing LS.

The trajectory 212 then leaves the contour of the first square 214A along a connecting segment 216B in the extension of the fourth side of the first square 214A to reach the contour of the second square 214B and follow its sides as previously described.

In this example, the exit point EP is situated in the extension of the fourth side of the second square 214B. The trajectory 212 therefore has a radius R, taken to be equal to the distance separating the starting point SP from a side of the square 214B furthest from the starting point, perpendicular to the initial trajectory IT.

Figure 8:
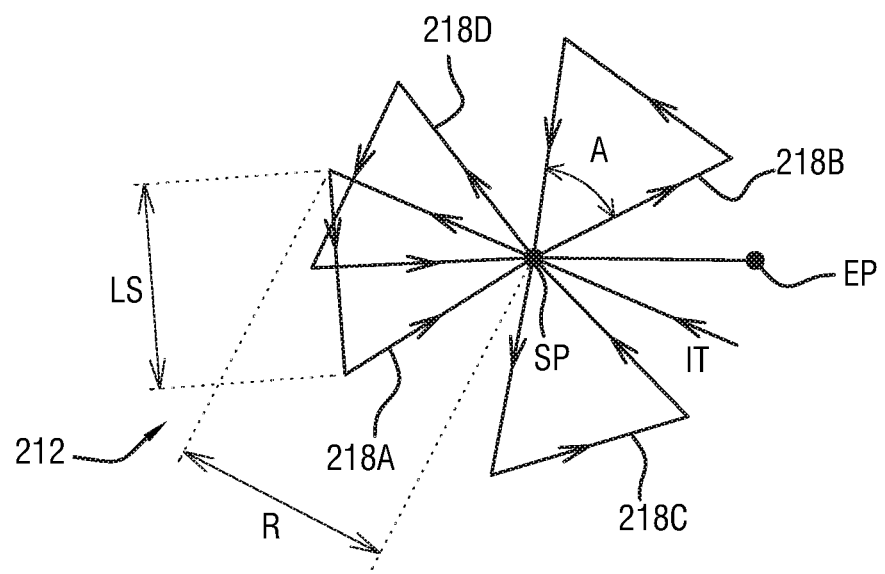

FIG. 8 illustrates another example so-called "sector" search and rescue trajectory 212.

This trajectory is for example suitable for searching for a ship or man overboard whose last position is known with relative precision both in terms of date and position, and for which the search zone is not too large.

The trajectory 212 follows angular sectors 218A to 218D, each angular sector 218A to 218D being defined by an isosceles triangle with an apex equal to the starting point SP, an angular expanse defined by an angle A, a base defined by a line spacing LS, and a side defined by a trajectory radius R. The first sector 218A is defined by the initial travel direction IT. The angles at the base of each angular sector 218A to 218B are defined from the angle A.

From the starting point SP, the trajectory 212 follows the side of a first angular sector 218A along an initial direction IT over a distance equal to the radius R. The trajectory 212 next has a turn by an angle equal to the angle at the base of the isosceles triangle with apex SP and apical angle A. Then, the trajectory follows the base of the isosceles triangle over a distance equal to LS, and next, over the opposite side of the isosceles triangle to the starting point SP.

The trajectory 212 extends aligned with the second side to follow the second angular sector 218B, then the third angular sector 218C after passing through the starting point SP, and lastly the fourth angular sector 218D after passing again through the starting point SP.

Figure 9:
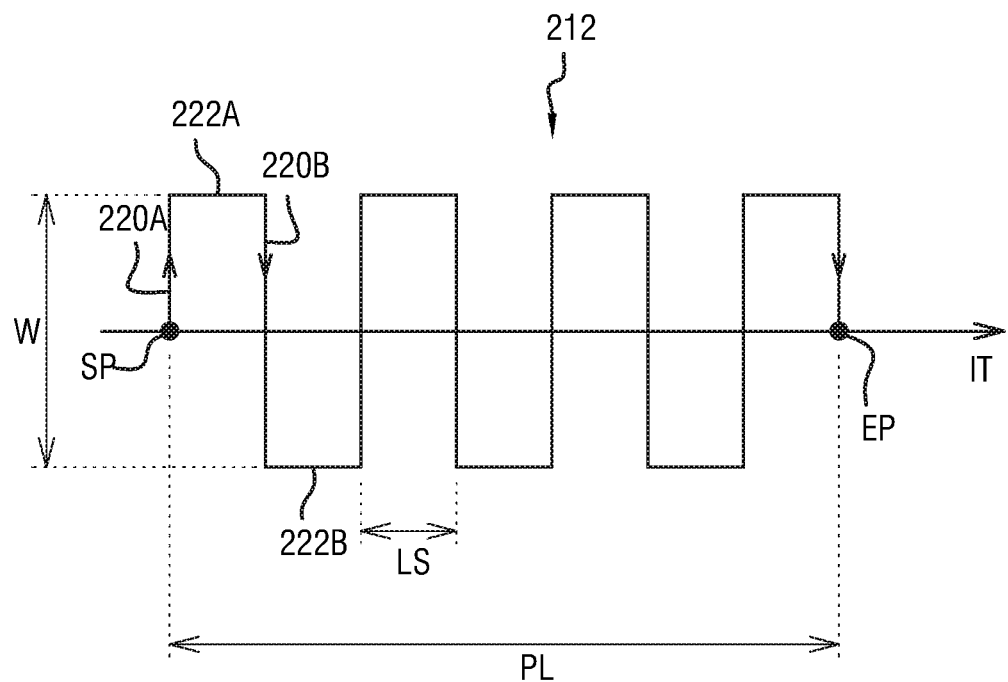

FIG. 9 illustrates another so-called "creeping ladder" search and rescue trajectory 212.

This trajectory 212 is for example intended to search for a man overboard from a boat, by following the movement direction of said boat.

This trajectory 212 advances globally in an initial direction IT from a starting point SP while zigzagging around the initial direction IT.

Aside from the starting point SP and the initial direction, this trajectory 212 is defined by a width W, a path length PL, and a line spacing LS. It is also defined by a first turning direction at the starting point (in the clockwise direction or the counterclockwise direction).

Initially, the trajectory 212 starts at the starting point SP along an initial transverse segment 220A perpendicular to the direction IT, over a distance equal to a half-width W/2.

It then comprises a 90° turn, and a longitudinal segment 222A with a length equal to the line spacing LS with a new 90° turn. It next comprises another transverse segment 220B that traverses the direction IT and that has a width equal to W. It then comprises a new 90° turn to perform a new longitudinal segment 222B situated opposite the first longitudinal segment 222A relative to the direction IT and in front of the first longitudinal segment 222A along the direction IT. This pattern is then repeated until the exit point EP is reached.

Figure 10:
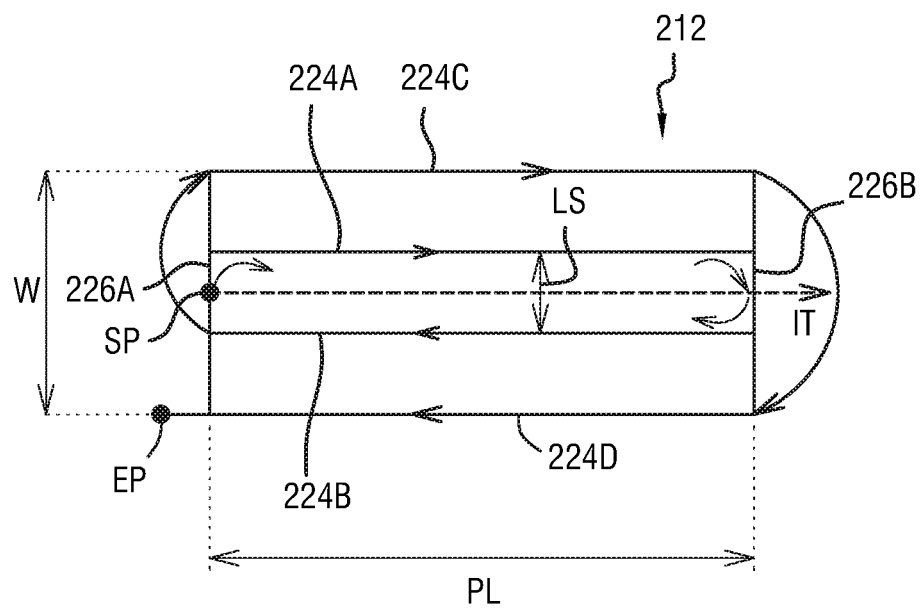

FIG. 10 illustrates a so-called "parallel" search and rescue trajectory 212.

This trajectory is for example suitable for searching for a shipwreck when the location thereof is uncertain.

It is defined by a starting point SP, an initial trajectory IT and a line spacing LS between the various segments 224A to 224D parallel to the initial direction IT, by a trajectory length PL and by a trajectory width W. It is also defined by a turning direction (in the clockwise direction or the counterclockwise direction).

The trajectory 212 starts from a starting point while moving along a transverse segment 226A perpendicular to the initial direction IT over a distance equal to half of the line spacing LS.

It then comprises a first segment 224A parallel to the initial direction IT over the length PL, before a 90° turn and a second transverse segment 226B with a length equal to the line spacing LS. It next comprises a third 90° turn to return to the starting point SP by following a second segment 224B parallel to the initial direction IT, in the direction opposite the first segment 224A at a distance equal to the line spacing LS of the first parallel segment 224A. It next comprises a 90° turn to follow another transverse segment including the first transverse segment 226A passing through the starting point SP, over a distance equal to two times the line spacing LS.

It next includes a third parallel segment 224C, parallel to the first segment 224A and spaced away from the latter separated from the starting point SP by a distance equal to LS, over a length equal to PL. The trajectory 212 then comprises a 90° turn, another transverse segment passing through the second transverse segment 226B and extending over a distance equal to three times the line spacing LS. It next comprises a fourth parallel segment 224D spaced away from the second parallel segment 224B separated from the starting point SP by a distance LS.

Alternatively, the user is able to choose an orbital trajectory, performing circles around a tactical track, and to define the parameters of the orbit. In this case, the display application 70 is able to display orbital tactical track symbol 98 in orbit.

This causes the flight management system 50 to load a search and rescue trajectory, or an orbital trajectory defined from the tactical track, the starting point of the trajectory advantageously being the geographical position of the tactical track.

The integrity verification application 80 is able to determine whether the tactical track data received from the outside apparatus 22 are consistent based on a verification principle according to the ARINC 429 protocol including generating a sign/status matrix (SSM) bit. Advantageously, the integrity verification application 80 is able to verify the sign/status matrix (SSM) bit to determine whether the data are reliable or unreliable.

The deactivation application 82 is able to deactivate the display of the positioning symbol 94 of the tactical track on the viewer 58, if the integrity verification application 80 determines that the data are not reliable. It is also able to deactivate the display of the tactical track positioning symbol 94 on the viewer 58, if no data is received coming from the outside apparatus 22 by the data recovery application 76 during a length of time exceeding a predetermined time delay, for example 2 s.

The operation of the implementing assembly 12 according to an embodiment of the invention will now be described.

Initially, the crew brings the aircraft 10 close to the mission zone. The mission operator activates the mission system 13. The sensors 18, 20 are turned on to detect the targets to be identified.

The application 34 for identifying and collecting tactical track data is implemented to identify at least one tactical track from signals received from each sensor 18, 20 and to collect the tactical track monitoring data coming from each sensor 18, 20. These data in particular include the geographical position of the tactical track as a function of time, as obtained from signals collected from the sensors 18, 20, and optionally the type of tactical track being monitored.

If necessary, the operator makes outside observations and enters tactical track monitoring data using the entry element 32. The identification and collection application 34 then collects the tactical track monitoring data entered manually by the operator.

The operator then implements the application for entering an identifier 36. He associates an alphanumeric identifier with each monitored tactical track, using the man-machine interface 28.

Once this is done, the data sending application 38 generates the sending of the data set, at a given frequency, for example greater than or equal to 10 Hz, to the transmission system 16.

The transmission of the data set includes, for each tactical track being monitored, at least one geographical position associated with the tactical track at a given time, and the identifier of the tactical track.

The data set is transmitted to the avionics system 14 through the data transmission system 16, at a transmission frequency for example greater than or equal to 10 Hz. The transmitter 42 advantageously produces a transmission signal that passes through the shielded twisted pair 46 to the receiver 44.

The data recovery application 76 recovers the tactical track monitoring data received by the receiver 44, and sends them to the display application 70.

Based on the geographical position of the tactical track at a given time, transmitted from the outside apparatus 22, the display application 70 displays, on the viewer 58, a tactical track positioning symbol 94 in the location on the viewer 58 corresponding to the geographical position.

Thus, the crew of the aircraft 10 monitors, directly on the viewer 58 of the flight management system 50, used for the navigation of the aircraft 10, the exact position of the or each monitored tactical track relative to the current position of the aircraft 10.

In particular, unlike the other predefined waypoints, which have a fixed geographical position, the geographical position of each tactical track changes over time and is updated dynamically on the viewer 58. This update is done based on tactical track data sent from the outside apparatus 22 through the data transmission system 16.

If the crew wishes to transform a monitored tactical track into a waypoint, it activates the selection and activation application 78, for example by placing a cursor on the tactical track positioning symbol 94, and performing the predefined maneuver (for example, a double-click or right-click).

The selection and activation application 78 is then able to generate the display, on the viewer 58, of the activation window 100 illustrated by FIG. 5.

The crew selects the button 102 to convert the selected tactical track into a waypoint. Optionally, the crew activates the button 104 to define the constraints relative to the new waypoint consisting of the selected tactical track. The window 110 illustrated in FIG. 6 appears. The crew then defines the values of the constraints in the fields 112 to 118.

If it wishes, the crew also activates a button 106 to include the waypoint defined by the selected tactical track in a pre-existing flight plan 92, or to go directly to the tactical track.

In parallel or additionally, the crew activates the button 108 to define the type of trajectory to be carried out and the parameters of the trajectory, when the aircraft 10 reaches the geographical position of the tactical track. The trajectory is for example a search and rescue trajectory 212 as defined above, or an orbit around the tactical track.

The flight plan definition application 72 then updates the flight plan 92 as a function of the data entered by the crew and recalculates the flight plan 92 to include the tactical track as a waypoint. This update is updated over time based on tactical track data received from the outside apparatus 22.

The, the crew activates the guiding application 74, to allow the automatic pilot system of the aircraft 10 to cause the aircraft 10 to follow the trajectory defined in the flight plan 92.

The implementing assembly 22 therefore allows an automatic sending of tactical track monitoring data between an apparatus 22 outside the avionics system 14, managed by a mission operator, and the avionics system 14, managed by the crew of the aircraft 10.

This greatly simplifies the communication between the mission operators and the crew to carry out a search and rescue mission. The crew has reliable data, in real time, on the geographical position of the tactical tracks to be monitored.

Furthermore, the tactical tracks are incorporated simply into the flight management system 50, and can be converted into waypoints having a geographical position that is updated over time. This allows the crew to integrate the tactical tracks, easily and reliably, into flight plans, using the flight management system 50, in the same way as a traditional waypoint. The crew's workload is therefore made simpler.

Advantageously, the above mentioned trajectories, illustrated in FIGS. 7 to 10, are carried out at a constant height.

What is claimed is:

1. An assembly for implementing a trajectory of an aircraft comprising:
   an avionics comprising a flight management system, the flight management system including a viewer, and a display application, the display application being configured to display on the viewer, navigation data of the aircraft including waypoints of the aircraft along the trajectory;
   a data acquisition apparatus configured to acquire tactical track monitoring data corresponding to at least one tactical track being monitored by the aircraft, the data acquisition apparatus being outside the avionics; and
   a data transmitter configured to send the tactical track monitoring data, the data transmitter connecting the data acquisition apparatus to the avionics,
   the flight management system including an application configured to recover the tactical track monitoring data corresponding to the at least one tactical track, the display application being configured to dynamically display, on the viewer, a tactical track positioning symbol corresponding to the at least one tactical track being monitored, a position of the tactical track positioning symbol being updated by the display application as a function of position data of the aircraft and the tactical track monitoring data corresponding to the at least one tactical track, received from the data acquisition apparatus, via the data transmitter,
   wherein the tactical track monitoring data includes a geographical position of the at least one tactical track as a function of time, obtained from signals collected from detection sensors and/or from data entered manually by an operator,
   wherein the flight management system comprises a verification application configured to verify an integrity of the tactical track monitoring data, and a deactivation application configured to deactivate the display of the tactical track positioning symbol of a given tactical track by the display application when the verification application verifying the integrity of the tactical track monitoring data indicates that the tactical track monitoring data are not reliable.

2. The assembly according to claim 1, wherein each waypoint has a fixed geographic position, the geographical position of the at least one tactical track changing over time, the tactical track monitoring data depending on the geographical position of the at least one tactical track.

3. The assembly according to claim 1, wherein the display application is configured to display a waypoint location symbol of at least one of the waypoints of the aircraft following the trajectory, as a function of the position data of the aircraft, the waypoint location symbol being different from the tactical track positioning symbol.

4. The assembly according to claim 1, wherein the tactical track monitoring data includes an identifier of the at least one tactical track being monitored, the display application being configured to display the identifier of the at least one tactical track being monitored with the tactical track positioning symbol of the at least one tactical track being monitored.

5. The assembly according to claim 1, wherein the flight management system includes a tactical track selection application, configured to allow the operator to activate the monitoring of the at least one tactical track from the tactical track positioning symbol of the at least one tactical track.

6. The assembly according to claim 5, wherein the flight management system includes a flight plan definition application for defining at least one flight plan passing through at least one of the waypoints of the aircraft along the trajectory, and a guiding application for guiding the aircraft along the flight plan, the tactical track selection application being configured to allow the insertion of the at least one tactical track into the flight plan, the flight plan definition application being configured to update the flight plan as a function of the tactical track monitoring data corresponding to the at least one tactical track, received from the data acquisition apparatus, via the data transmitter.

7. The assembly according to claim 6, wherein the flight plan definition application is configured to update the flight plan as a function of at least one defined constraint, the tactical track selection application being configured to allow a definition of at least one defined constraint chosen from among an altitude of the aircraft at the at least one tactical track, a speed of the aircraft at the at least one tactical track, an arrival angle of the aircraft at the at least one tactical track, and an arrival time of the aircraft at the at least one tactical track.

8. The assembly according to claim 5, wherein the tactical track selection application is configured to load a search and rescue trajectory, or an orbital trajectory defined from the at least one tactical track, the flight management system including an application for guiding the aircraft along the search and rescue trajectory or along the orbital trajectory.

9. The assembly according to claim 1, wherein the deactivation application is further configured to deactivate the display of the tactical track positioning symbol of the at least one tactical track monitored by the display application in the absence of transmission of the tactical track monitoring data corresponding to the at least one tactical track being monitored for a length of time exceeding a predefined time delay.

10. The assembly according to claim 1, wherein the data transmitter comprises a dedicated datalink between the data acquisition apparatus and the avionics.

11. The assembly according to claim 10, wherein the dedicated datalink is a wired link.

12. The assembly according to claim 11, wherein the dedicated datalink is a link according to standard ARINC 429.

13. The assembly according to claim 1, wherein the tactical track monitoring data are radar data, data from optoelectronic sensors and/or infrared sensors, and/or observation data entered by the operator.

14. A method for implementing the trajectory of the aircraft including:
providing the assembly according to claim 1;
acquiring, via the data acquisition apparatus, the tactical track monitoring data corresponding to the at least one tactical track monitored by the aircraft;
sending the tactical track monitoring data via the data transmitter connecting the data acquisition apparatus to the avionics;
recovering the tactical track monitoring data via the flight management system;
dynamically displaying, via the display application of the flight management system, the tactical track positioning symbol of the at least one tactical track on the viewer; and
updating the position of the tactical track position symbol via the display application as a function of the position data of the aircraft and the tactical track monitoring data corresponding to the at least one tactical track, received from the data acquisition apparatus, via the data transmitter.

15. The method according to claim 14, further comprising, in response to a selection of, on the viewer by the operator, the tactical track positioning symbol, activating the monitoring of the at least one tactical track from the tactical track positioning symbol.

16. The method according to claim 14, further comprising, in response to a selection of, on the viewer by the operator, the tactical track positioning symbol, activating the monitoring of the at least one tactical track comprises inserting the at least one tactical track into a flight plan, and/or loading a search and rescue trajectory, or an orbital trajectory defined from the at least one tactical track.

17. An assembly for implementing a trajectory of an aircraft comprising:
an avionics comprising a flight management system, the flight management system including a viewer, and a display application, the display application being configured to display on the viewer, navigation data of the aircraft including waypoints of the aircraft along the trajectory;
a data acquisition apparatus configured to acquire tactical track monitoring data corresponding to at least one tactical track being monitored by the aircraft, the data acquisition apparatus being outside the avionics; and
a data transmitter configured to send the tactical track monitoring data, the data transmitter connecting the data acquisition apparatus to the avionics,
the flight management system including an application configured to recover the tactical track monitoring data corresponding to the at least one tactical track, the display application being configured to dynamically display, on the viewer, a tactical track positioning symbol corresponding to the at least one tactical track being monitored, a position of the tactical track positioning symbol being updated by the display application as a function of position data of the aircraft and the tactical track monitoring data corresponding to the at least one tactical track, received from the data acquisition apparatus, via the data transmitter,
wherein the flight management system comprises a deactivation application configured to deactivate the display of the tactical track positioning symbol of the at least one tactical track monitored by the display application in the absence of transmission of the tactical track monitoring data corresponding to the at least one tactical track being monitored for a length of time exceeding a predefined time delay.

18. An assembly for implementing a trajectory of an aircraft comprising:
an avionics comprising a flight management system, the flight management system including a viewer, and a display application, the display application being configured to display on the viewer, navigation data of the aircraft including waypoints of the aircraft along the trajectory;
a data acquisition apparatus configured to acquire tactical track monitoring data corresponding to at least one tactical track being monitored by the aircraft, the data acquisition apparatus being outside the avionics; and
a data transmitter configured to send the tactical track monitoring data, the data transmitter connecting the data acquisition apparatus to the avionics,
the flight management system including an application configured to recover the tactical track monitoring data corresponding to the at least one tactical track, the display application being configured to dynamically display, on the viewer, a tactical track positioning symbol corresponding to the at least one tactical track being monitored, a position of the tactical track positioning symbol being updated by the display application as a function of position data of the aircraft and the tactical track monitoring data corresponding to the at least one tactical track, received from the data acquisition apparatus, via the data transmitter,
wherein the tactical track monitoring data includes a geographical position of the at least one tactical track as a function of time, obtained from signals collected from detection sensors and/or from data entered manually by an operator,
wherein the flight management system comprises a deactivation application configured to deactivate the display of the tactical track positioning symbol of the at least one tactical track monitored by the display application in the absence of transmission of the tactical track monitoring data corresponding to the at least one tactical track being monitored for a length of time exceeding a predefined time delay.

* * * * *